(12) United States Patent
Teyeb et al.

(10) Patent No.: US 11,219,085 B2
(45) Date of Patent: Jan. 4, 2022

(54) METHODS PROVIDING DUAL CONNECTIVITY COMMUNICATION AND RELATED NETWORK NODES AND WIRELESS TERMINALS

(71) Applicant: Telefonaktiebolaget LM Ericsson (publ), Stockholm (SE)

(72) Inventors: Oumer Teyeb, Solna (SE); Markus Drevö, Linköping (SE); Paul Schliwa-Bertling, Ljungsbro (SE); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 801 days.

(21) Appl. No.: 16/066,095

(22) PCT Filed: Mar. 20, 2018

(86) PCT No.: PCT/SE2018/050279
§ 371 (c)(1),
(2) Date: Jun. 26, 2018

(87) PCT Pub. No.: WO2018/174791
PCT Pub. Date: Sep. 27, 2018

(65) Prior Publication Data
US 2021/0204355 A1 Jul. 1, 2021

Related U.S. Application Data

(60) Provisional application No. 62/476,627, filed on Mar. 24, 2017.

(51) Int. Cl.
*H04W 76/34* (2018.01)
*H04W 76/19* (2018.01)
*H04W 76/15* (2018.01)

(52) U.S. Cl.
CPC .......... *H04W 76/34* (2018.02); *H04W 76/15* (2018.02); *H04W 76/19* (2018.02)

(58) Field of Classification Search
CPC ........ H04L 5/00; H04L 5/0098; H04W 76/34; H04W 76/19; H04W 76/15; H04W 36/0069
See application file for complete search history.

(56) References Cited

U.S. PATENT DOCUMENTS

2015/0045035 A1* 2/2015 Nigam .............. H04W 36/0079
455/436
2015/0049707 A1* 2/2015 Vajapeyam ........... H04W 76/19
370/329

(Continued)

FOREIGN PATENT DOCUMENTS

EP 3171625 A1 5/2017
JP 2016054537 B2 4/2016

(Continued)

OTHER PUBLICATIONS

International Search Report and Written Opinion of the International Searching Authority, PCT/SE2018/050279, dated May 29, 2018, 17 pages.

(Continued)

*Primary Examiner* — Benjamin H Elliott, IV
(74) *Attorney, Agent, or Firm* — Sage Patent Group

(57) ABSTRACT

Methods may be provided to operate a network node supporting dual connectivity communication with a wireless terminal as a main network node in cooperation with a secondary network node. Dual connectivity communication with the wireless terminal may be provided in cooperation with the secondary network node. Responsive to deciding to suspend the dual connectivity communication with the wireless terminal, a connection release message may be transmitted to the wireless terminal, a suspension indication (Continued)

message may be transmitted to the secondary network node, the dual connectivity communication with the wireless terminal may be suspended. Related methods may be provided to operate secondary network nodes and wireless terminals.

21 Claims, 9 Drawing Sheets

(56) References Cited

U.S. PATENT DOCUMENTS

| | | | | |
|---|---|---|---|---|
| 2015/0117183 | A1* | 4/2015 | Heo | H04W 36/0055 370/228 |
| 2015/0282239 | A1* | 10/2015 | Han | H04W 76/27 370/329 |
| 2016/0057800 | A1* | 2/2016 | Ingale | H04W 76/18 370/216 |
| 2016/0316508 | A1* | 10/2016 | Hong | H04W 76/15 |
| 2018/0199230 | A1* | 7/2018 | Lee | H04W 28/0278 |
| 2019/0141776 | A1* | 5/2019 | Kim | H04W 76/20 |

FOREIGN PATENT DOCUMENTS

| | | | | |
|---|---|---|---|---|
| JP | 2016532391 A | 10/2016 | | |
| WO | 2016019584 A1 | 2/2016 | | |
| WO | WO 2016/138937 A1 | 9/2016 | | |
| WO | WO-2018174791 A1 * | 9/2018 | | H04L 5/001 |

OTHER PUBLICATIONS

3$^{rd}$ Generation Partnership Project; Technical Specification Group Radio Access Network; Study on New Radio Access Technology; Radio Interface Protocol Aspects (Release 14) 3GPP TR 38.804 V1.0.0 (Mar. 2017) XIP051290378, 56 pages.

3GPP TSG-RAN WG2 NR Adhoc, "Measurement Coordination in LTE/NR Tight Interworking," (R2-1700056) Agenda Item 3.2.2.5, Spokane, WA, USA, Jan. 17-19, 2017, XIP051210643, 6 pages.

Communication pursuant to Article 94(3) EPC for European application No. 18714083.5 dated Apr. 30, 2020, 10 pages.

Ericsson (Rapporteur), 36.331 Running CR to capture C-IoT optimizations for non-NB-IoT UEs, 3GPP TSG-RAN WG2 Meeting #94 Nanjing, China, May 23-27, 2016, R2-164427, XP051112527, 36 pages.

Search Report with English Translation for Japanese Patent Application No. 2019-552535 dated Jan. 7, 2021, 6 pages.

Qualcomm Incorporated, "RAN based notification area in inactive state", 3GPP TSG-RAN WG3 Meeting #93bis Sophia Antipolis, France, Oct. 10-14, 2016, R3-162195, 5 pages.

* cited by examiner

Supported Bearer Types For LTE-NR Tight Interworking

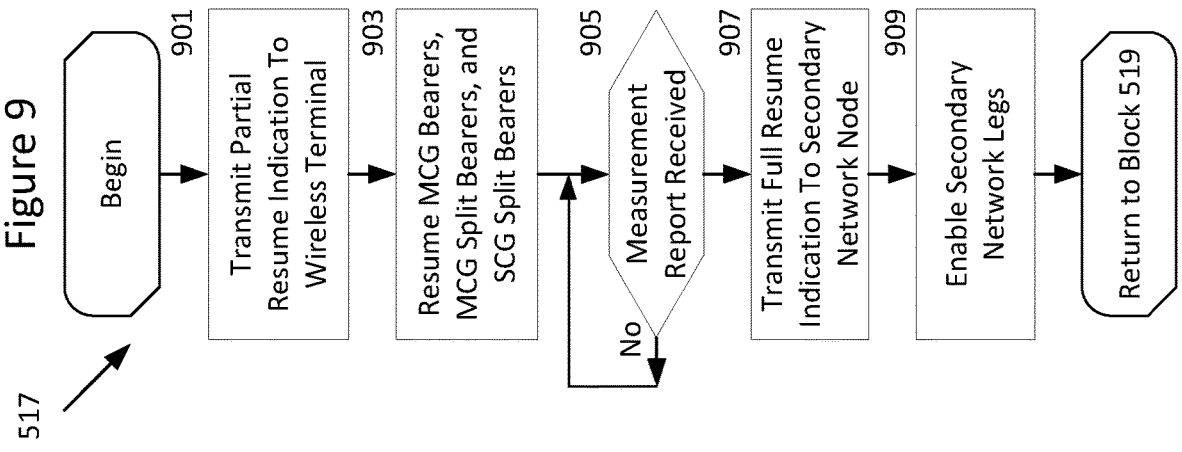
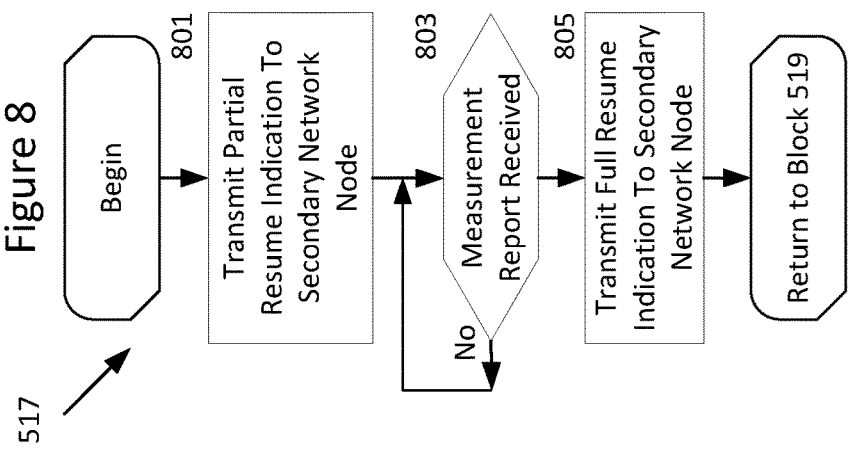
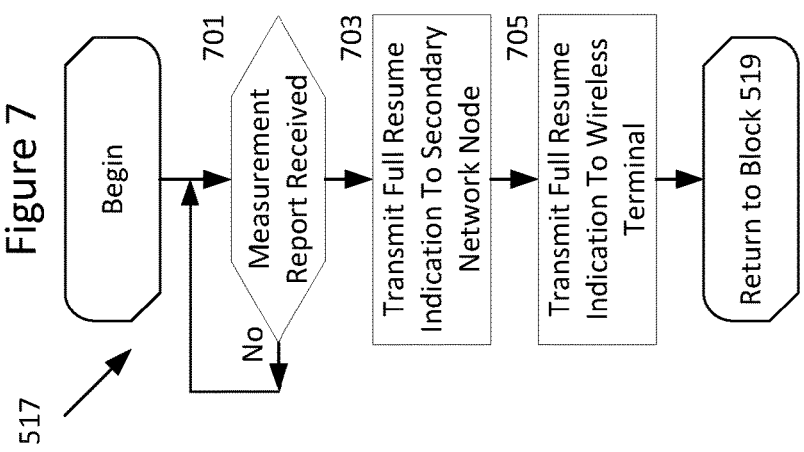

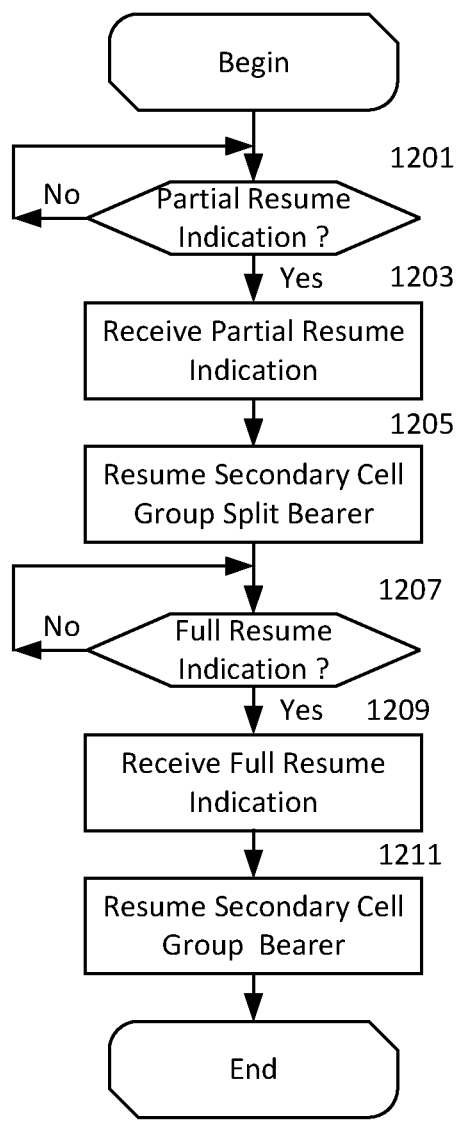

METHODS PROVIDING DUAL CONNECTIVITY COMMUNICATION AND RELATED NETWORK NODES AND WIRELESS TERMINALS

CROSS REFERENCE TO RELATED APPLICATIONS

This application is a 35 U.S.C. § 371 national stage application of PCT International Application No. PCT/SE2018/050279 filed on Mar. 20, 2018, which in turns claims domestic priority to U.S. Provisional Patent Application No. 62/476,627 filed on Mar. 24, 2017, the disclosures and content of which are incorporated by reference herein in their entirety.

TECHNICAL FIELD

The present disclosure relates to the field of communications, and more particularly to methods providing wireless communications and related network nodes and wireless terminals.

BACKGROUND

For the LTE-NR tight interworking case, it has been agreed to support four bearer types, namely: MCG bearer, MCG split bearer, SCG bearer and SCG split bearer. This is illustrated in FIG. 1.

FIG. 1 illustrates supported bearer types for LTE-NR tight interworking. In 3GPP, work is ongoing, both in LTE and NR, toward supporting lightly connected UE (inactive mode), which can be considered as an intermediate state between IDLE and CONNECTED modes, where the UE AS context is kept both at the UE and RAN, where the UE can still be seen as if it is in connected mode from the CN point of view and in IDLE mode from the RAN point of view. The advantage of operating in this mode is reduced signaling towards the CN and faster transition to CONNECTED mode as compared to IDLE-CONNECTED mode transitions, while maintaining the UE power saving advantages of IDLE mode.

As used herein, the terms "inactive", "suspended", and "lightly connected" are used interchangeably throughout this document. It is still FFS (For Further Study) whether a UE's inactive↔connected mode transitions are hidden completely from the CN (Core Network), from both CP (Control Plane) and UP (User Plane) perspectives. The discussion in this disclosure relates primarily to the RAN aspects and thus applicable to both cases (i.e. CN is aware of the inactive/connected state transitions or the state transitions are transparent to the CN).

Handling suspend/resume operations in Dual Connectivity DC scenarios may be complicated, however, because there are two RAN nodes involved (i.e., a main node MN and a secondary node SN) and several radio bearer types that terminate at the MN and/or SN. Supporting suspend/resume operations for DC in the context of LTE-NR tight interworking may be further complicated because the MN and SN belong to different RATs.

SUMMARY

According to some embodiment of inventive concepts, a method may be provided to operate a network node supporting dual connectivity communication with a wireless terminal as a main network node in cooperation with a secondary network node. Dual connectivity communication with the wireless terminal may be provided in cooperation with the secondary network node. Responsive to deciding to suspend the dual connectivity communication with the wireless terminal, a connection release message may be transmitted to the wireless terminal, a suspension indication message may be transmitted to the secondary network node, the dual connectivity communication with the wireless terminal may be suspended.

According to some other embodiments of inventive concepts, a method may be provided to operate a network node supporting dual connectivity with a wireless terminal as a secondary network node in cooperation with a main network node. Dual connectivity communication with the wireless terminal may be provided in cooperation with the main network node. A suspension indication message may be received. Responsive to receiving the suspension indication message from the main network node, the dual connectivity communication with the wireless terminal may be suspended.

According to still other embodiments of inventive concepts, a method may be provided to operate a wireless terminal supporting dual connectivity with a main network node and a secondary network node. Dual connectivity communication may be provided with the main network node and the secondary network node. A connection release message may be received from the main network node. Responsive to receiving the connection release message, the dual connectivity communication with the main network node and the secondary network node may be suspended.

According to some embodiments of inventive concepts, it may be possible to suspend and resume all the relevant wireless terminal UE bearers operating in an LTE-NR tight interworking context to the same MN and SN if/when network and/or radio conditions allow. In the alternative, the LTE-NR tight interworking may be resumed with any of the old MN and a new SN, the old SN and a new MN, or a new MN and a new SN. Moreover, reduced signaling and/or latency may be provided, loss of data and/or delay may be reduced, and/or data flow between the SN and the UE may be provided temporarily in a time between partial and full resumption.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIGS. 5, 7, 8, and 9 are flow charts illustrating operations of a main network node according to some embodiments of inventive concepts;

FIGS. 6 and 12 are flow charts illustrating operations of a of a secondary network node according to some embodiments of inventive concepts.

DETAILED DESCRIPTION OF EMBODIMENTS

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 1:
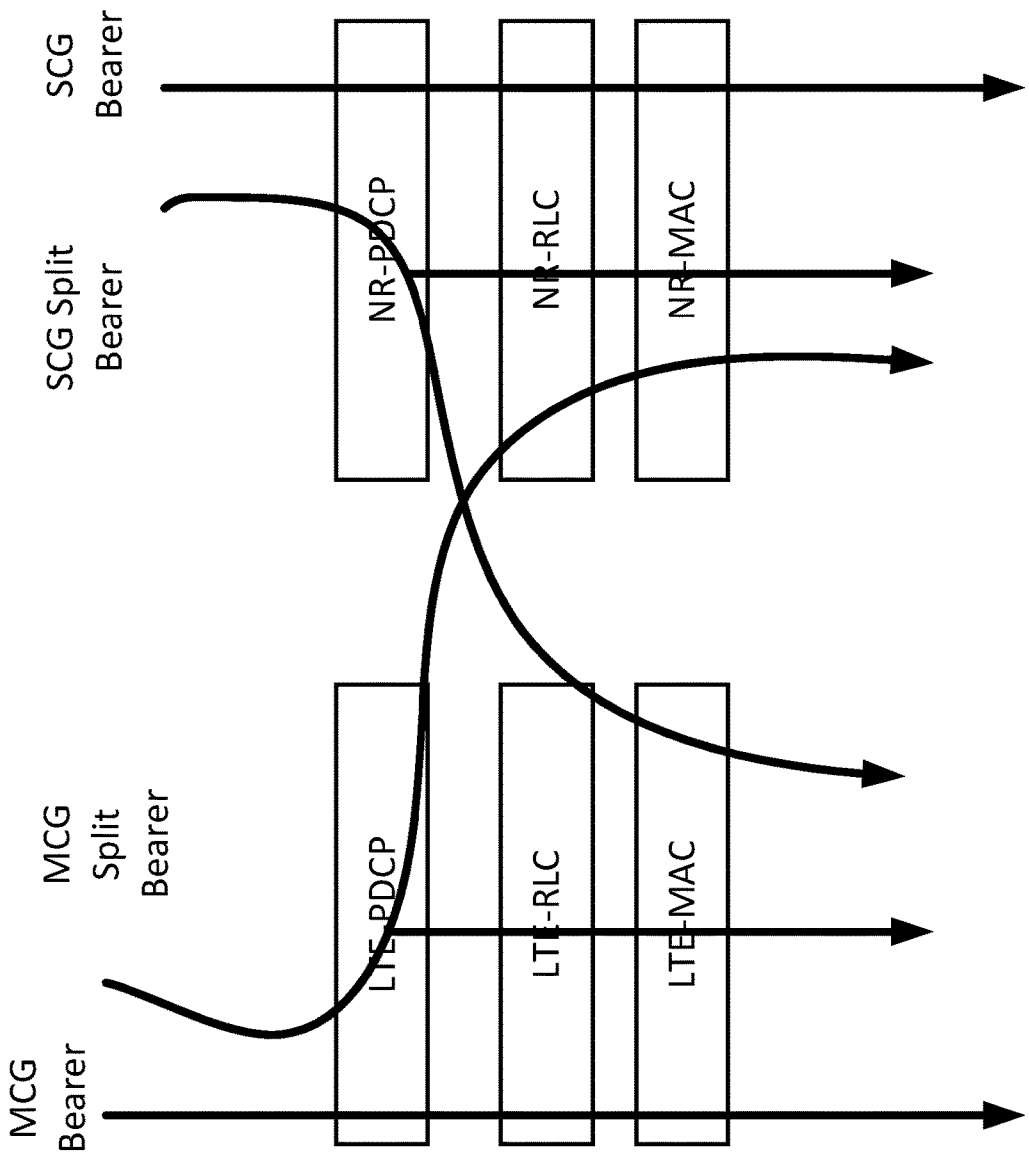
FIG. 1 is a block diagram illustrating supported bearer types for LTE-NR tight interworking.
Figure 2A:
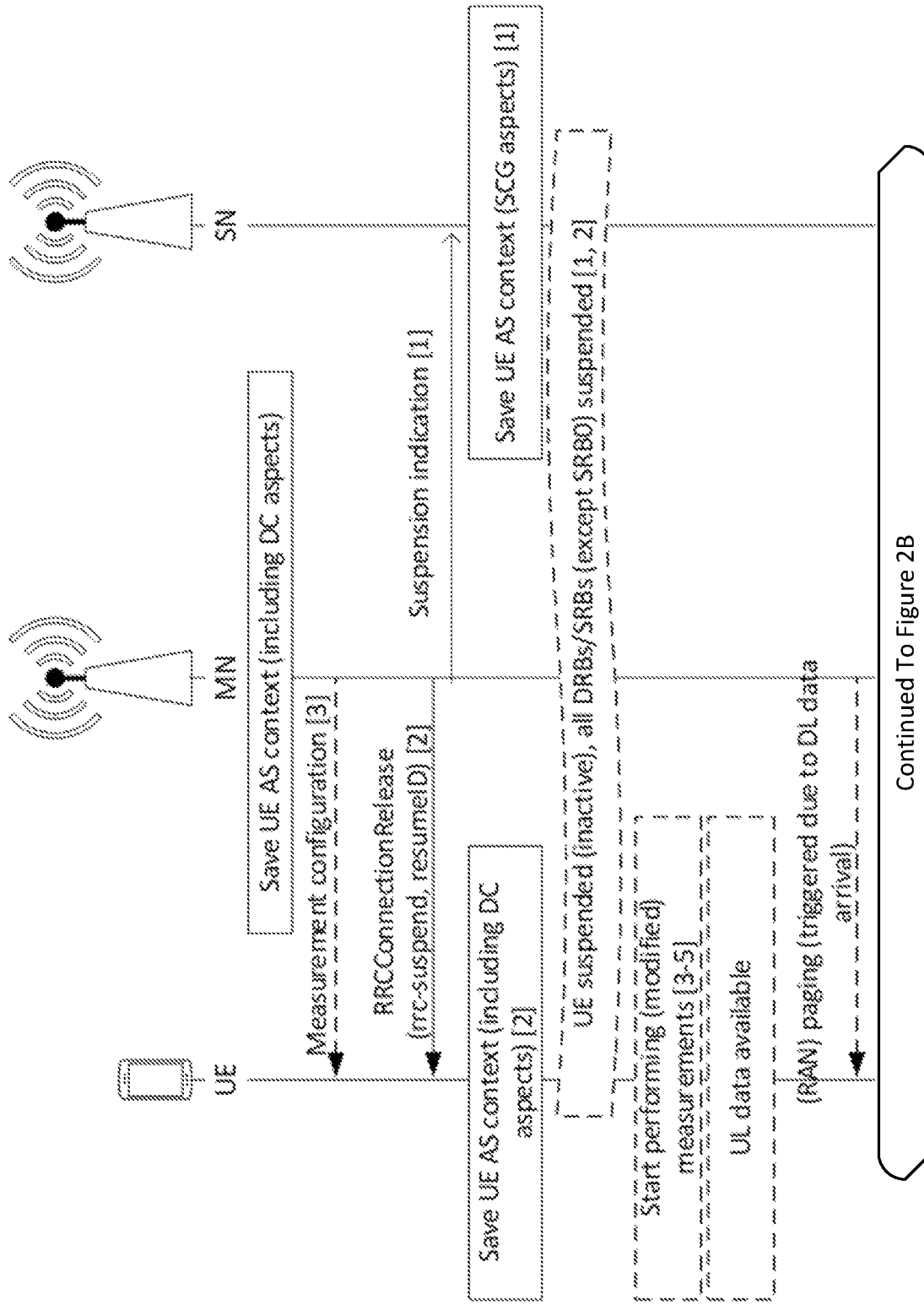
FIGS. 2A, 2B, and 2C provide a message diagram illustrating network operations according to some embodiments of inventive concepts.
Figure 2B:
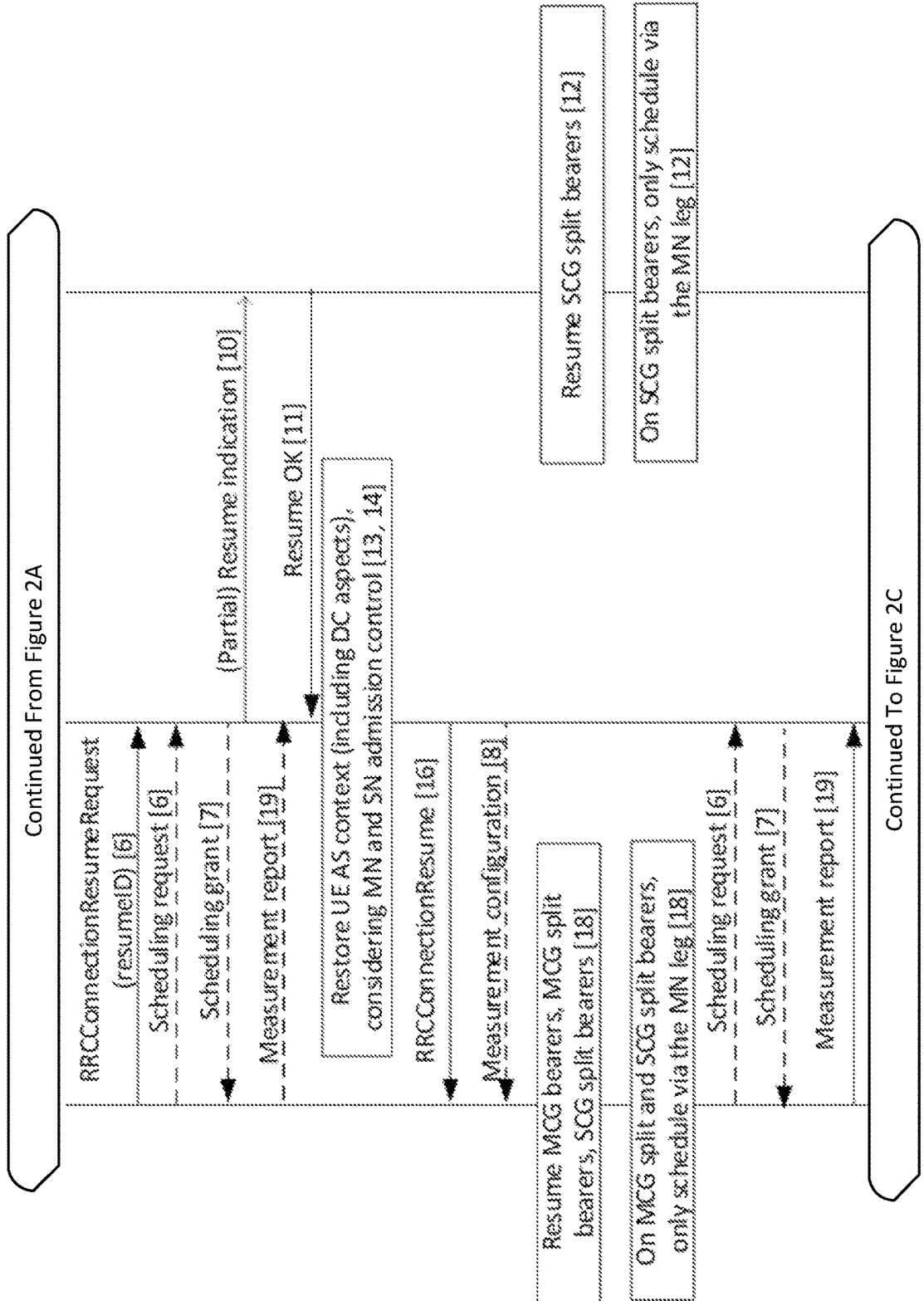
Figure 2C:
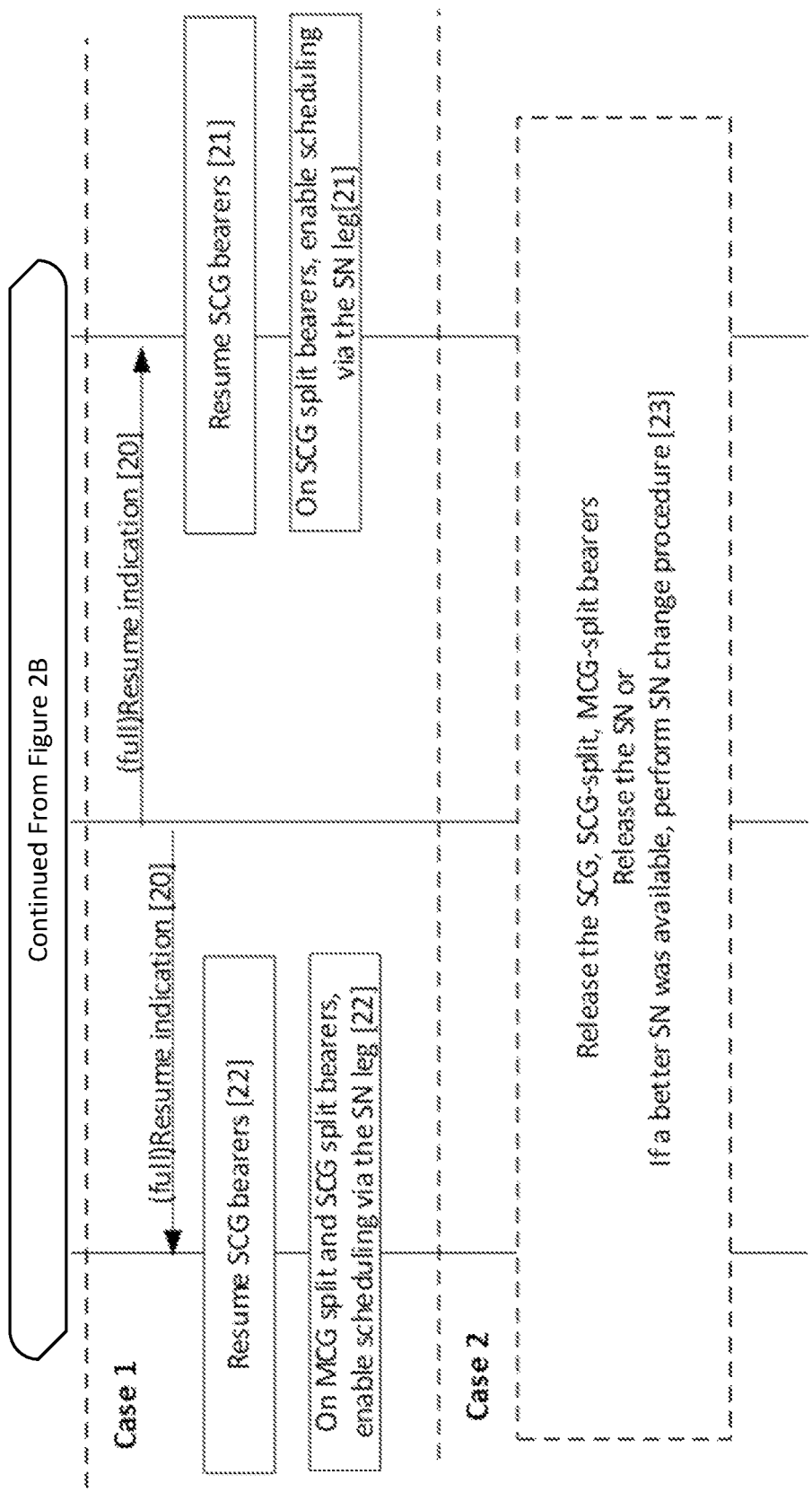
Figure 3:
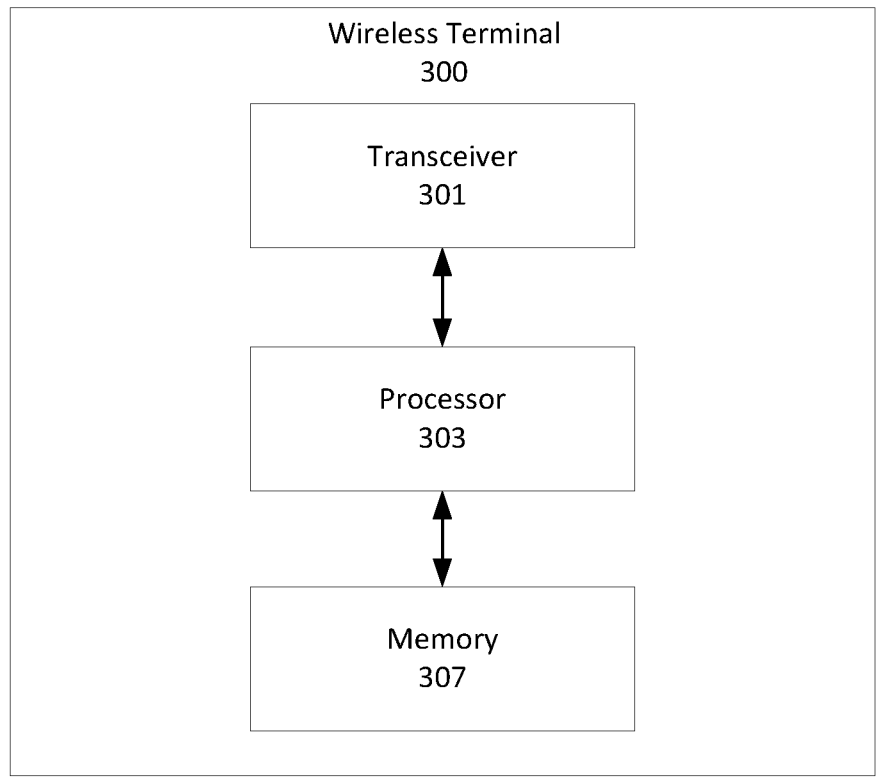
FIG. 3 is a block diagram illustrating elements of a wireless terminal UE according to some embodiments of inventive concepts.

FIG. 3 is a block diagram illustrating a wireless terminal UE (also referred to as a mobile terminal, user equipment, user equipment node, etc.) according to some embodiments disclosed herein. As shown, wireless terminal UE 300 may include processor 303 coupled with transceiver 301, and memory 307. Transceiver 301 may include one or more of a cellular radio access network (RAN) interface (also referred to as a RAN transceiver) and/or other wireless network communication interface. Wireless terminal can thus provide wireless communication over one or more radio links with one or more radio access network nodes (also referred to as base stations, eNodeBs, eNBs, etc.). Processor 303 (also referred to as a processor circuit or processing circuitry) may include one or more data processing circuits, such as a general purpose and/or special purpose processor (e.g., microprocessor and/or digital signal processor). Processor 303 may be configured to execute computer program instructions from functional modules in memory 307 (also referred to as a memory circuit or memory circuitry), described below as a computer readable medium, to perform some or all of the operations and methods that are described herein for one or more of the embodiments. Moreover, processor 303 may be defined to include memory so that separate memory 307 may not be required. Wireless terminal 300, processor 303, and transceiver 301 may thus perform operations, for example, discussed below with respect to the message diagram of FIGS. 2A, 2B, and 2C and with respect to Example Embodiments.

Figure 4:
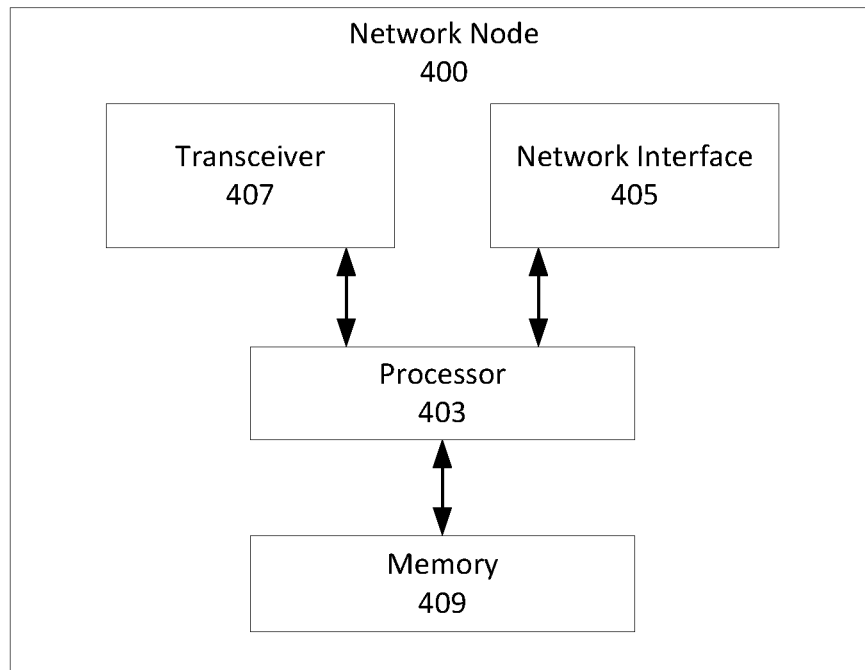
FIG. 4 is a block diagram illustrating elements of a network node according to some embodiments of inventive concepts.

FIG. 4 is a block diagram illustrating a network node 400 according to some embodiments disclosed herein. As shown, network node 400 may include processor 403 coupled with network interface 405, transceiver 407, and memory 409. Transceiver 407 may include a cellular radio access network (RAN) interface (also referred to as a RAN transceiver) and/or other wireless network communication interface. Network node 400 can thus provide wireless communication over one or more radio links with one or wireless terminals. Network interface 405 may provide communication with other network nodes/devices such as a plurality of network nodes, for example to support dual connectivity for a wireless terminal. Processor 403 (also referred to as a processor circuit or processing circuitry) may include one or more data processing circuits, such as a general purpose and/or special purpose processor (e.g., microprocessor and/or digital signal processor). Processor 403 may be configured to execute computer program instructions from functional modules in memory 409 (also referred to as a memory circuit or memory circuitry), described below as a computer readable medium, to perform some or all of the operations and methods that are described herein for one or more of the embodiments. Moreover, processor 403 may be defined to include memory so that separate memory 409 may not be required. The structure of FIG. 4 may be applied to a main network node or to a secondary network node in the context of dual connectivity. Network node 400, processor 403, network interface 405, and transceiver 407 may thus perform operations, for example, discussed below with respect to MN and/or SN from the message diagram of FIGS. 2A, 2B, and 2C and with respect to related Example Embodiments.

In LTE, when a decision is made by the network to move the UE to inactive state, the eNB sends the UE an RRCConnectionRelease message with the release cause of rrc-suspend and it is also provided with a resumeIdentity. The UE stores the resumeIdentity and UE AS context (including the current RRC configuration, the current security context, the PDCP state including ROHC state, C-RNTI used in the source PCell, the cellIdentity and the physical cell identity of the source PCell); re-establishes all RLC entities (both for SRBs and DRBs); and suspends all DRBs and SRBs expect SRB0.

When the UE later on wants to resume the connection (in response to an UL data to be sent or a paging request for DL data), it sends an RRCConnectionResumeRequest message with the saved resumeIdentity. The eNB responds with an RRCConnectionResume message, and both the UE and eNB restore the saved UE context, and data transmission/reception from/to the UE can be resumed. Note that the resume operation can be performed in an eNB other than the eNB that was serving the UE when the UE was suspended. In that case, the new eNB can perform a context fetch, e.g., by using the Retrieve UE Context procedure from the old eNB (as the resumeIdentity includes information about the old eNB/cell).

Handling suspend/resume operations in Dual Connectivity (DC) scenarios is complicated because there are two RAN nodes involved (i.e. MN (main node) and SN (secondary node)) and several radio bearer types that terminate at MN or SN. Currently, the specifications do not explicitly handle the DC case, and as such it is up to RAN implementation. Some possible examples are:

Before the UE is suspended, all bearers except MCG bearers are released; or

When the UE is asked to resume, a new bearer configuration can be provided in the RRCConnectionResume message (via the optional radioResourceConfigDedicated IE available), which could either release the non-MCG bearers or modify them to become MCG bearers) Supporting suspend/resume operations in the context of LTE-NR tight interworking becomes even more complicated because the MN and SN now belong to different RATs. We now also have support for a new bearer type (SCG-Split bearer) that is terminated at the SN.

A complete support of RRC suspend/resume in the LTE-NR tight interworking case demands the restoration of all the UE's DRBs (i.e. MCG, MCG-Split, SCG, SCG-Split) on resume. However, this could only be achieved if the radio conditions between the UE and the MN/SN have not changed (e.g. UE has not moved) and the conditions in both MN and SN have not changed considerably during the time the UE was in inactive mode (e.g. there are available resources at both the MN and SN to support all the bearers as when the UE was suspended). Unless the UE has been in inactive mode only for a very short time, these assumptions don't hold. For example:

The UE has moved and the radio conditions with the old SN are not good anymore
UE is now near the cell edge of the SN, or
UE is outside the coverage area of the SN
There is another SN with a better radio conditions to the UE than the old SN
UE not in the coverage area of any SN
UE has moved to the coverage area of another MN, where the old SN has no Xn connection with Thus, it may be either impossible or very inefficient to resume all the bearers when the UE operating in DC. As mentioned above, one way of dealing with this is by releasing all the non-MCG bearers when the UE is suspended or resumed. However, doing so could also end up being inefficient because soon after it could become apparent (e.g. when subsequent measurement reports are received) that the UE can be put into LTE-NR tight interworking mode with the same MN and SN.

According to some embodiments disclosed herein, the above issues may be addressed and/or mechanisms may be provided to handle suspend/resume operations efficiently.

According to some embodiments, mechanisms may be provided to efficiently suspend and resume a UE operating in LTE-NR tight interworking mode.

With the mechanisms described herein, it will be possible to suspend and resume all the relevant bearers UE operating in LTE-NR tight interworking to the same MN and SN, if the network and radio conditions allow it. And when this is not possible, the LTE-NR tight interworking can be resumed with any of the combinations of old MN—new SN, new MN—old SN or new MN—new SN. It is also possible to revert the UE into non-DC mode, if the network and radio conditions don't favor dual connectivity.

Other advantages may include: reduced signaling and latency because we don't have to tear down the non-MCG bearers and set them up again after a while
The other way around: we don't try to blindly keep the non-MCG bearers running and risk loss of data/delay . . . .
We can keep data flowing between the SN and UE temporarily (via the split SCG) even when we don't have radio connection up with the SN, in the time between partial resumption and full resumption.

FIGS. 2A, 2B, and 2C illustrates operations according to some embodiments of inventive concepts, and operations of FIGS. 2A, 2B, and 2C (identified with operation numbers in brackets which correspond to the following operations) are discussed in greater detail below.

Disclaimer: In the following discussion, the case of LTE-NR interworking is discussed where the MN is an LTE node and the SN is an NR node as an example. However, all the embodiments are applicable to the case where the NR node is the master and the LTE is the SN. The embodiments are generally applicable to any two nodes operating under the same or different RAT (e.g., LTE-LTE DC, NR-NR DC, LTE-NR DC, X-Y DC, where X and Y are any two cellular RATs that support DC operation between them).

Operation 1: when the MN decides to suspend the UE, it notifies the SN about it. When the SN receives such a message:
it saves the UE AS context from its point of view (i.e. including the current SN RRC configuration, the current security context over the SCGs, the SN PDCP state including ROHC state, C-RNTI used in the PSCell, the SN cellIdentity and the physical cell identity of the source PSCell);
it associates this context with the resumeIdentity provided along with the indication from the MN, or assigns it a local identity
suspends all SCG and SCG-split bearers.

Operation 2: when the MN decides to suspend the UE, it notifies the UE with an RRCConnectionRelease command with the rrc-suspend flag on, When the UE receives such a message
it saves its AS context (i.e. including the RRC configurations from both the MN and SN, the current security context over the MCGs and SCGs, the SN PDCP state including ROHC state for all the bearers, C-RNTIs used in the PCell and PSCell, the MN and SN cellIdentity and the physical cell identities of the source PCell and PSCell);
suspends all bearers.

Operation 3: when the MN decides to suspend the UE, along with the suspended message, it can configure the UE to keep performing measurements on either or both of the RATs of the MN and SN, while being in inactive mode. In order not to drain the UE battery, this measurement configuration can include:
indications that the measurement is to be performed at a periodicity longer than normal operations; and/or
the measurement filtering can be done over a shorter interval Operation 4: A variant of Operation 3, where the UE that is operating in LTE-NR interworking is suspended, it assumes that it has to perform measurements in the RATs of the either or both of the RATs of the MN and/or SN, after it has gone to inactive state. The parameters that determine these measurements such as the periodicity and filtering durations can be given to the UE via RRC signaling any time while the UE was in CONNECTED mode, or can be hardcoded in the UE (e.g. SIM card)

Operation 5: According to Operations 3 and 4, the UE performs measurements of the MN and/or SN RATs using the provided/available measurement configurations Operation 6: When the UE tries to resume later on due to an arrival of UL data, or a DL data has triggered RAN level paging and it is responding to that, it can also indicate an indication that a measurement is available. This can be via an information that can be included in the RRCConnectionResumeRequest message or by sending a normal scheduling request on PUCCH.

Operation 7: When the MN receives the resume request from the UE, with an indication it has a measurement report pending (or it receives a separate scheduling request), it allocates the required resources to the UE in the DL and indicates this to the UE (via normal PDCCH grant info).

Operation 8: As an alternative to Operations 3 to 7, the UE is not configured to perform measurements when it is in inactive mode but rather only after the RRCConnectionResume command is received from the MN. This can be understood implicitly by the UE (i.e. if it is an inactive mode UE that was in LTE-NR tight interworking mode before moving to inactive mode, it will start measurement when receiving the resume command) or it can be explicit (configuration sent along with the resume command).

Operation 9: As an alternative to Operation 8, the UE is not configured to perform measurements when it is in inactive mode but starts to do so after:
receiving a paging indicating DL data
before sending an RRCConnectionResumeRequest message
after sending an RRCConnectionResumeRequest message upon arrival of a UL data
  before sending an RRCConnectionResumeRequest message
    after sending an RRCConnectionResumeRequest message Operation 10: The MN, on receiving the RRCConnectionResumeRequest from the UE, and before sending RRCConnectionResume command to the UE, sends an indication to the SN (along with the resumeIdentity) to inform the SN that the UE is being activated.

Operation 11: Upon the reception of the activation information from the MN, the SN finds the corresponding UE AS context based on the resumeIdentity and performs admission control (to check if it has enough resources to admit the UE). The SN can respond to the MN the result of the admission control. This can be a simple flag/bit indicating success or failure, or it could be a detailed message indicating which of the UE's bearers (i.e. SCG bearers and SCG split bearers) could be admitted.

Operation 12: The SN, if it performs the admission control as of Operation 11 and if that was a success (i.e. at least one SCG related bearer was admitted), or if it performs no admission control, will resume any (admitted, if that applies) SCG-split bearers and configures the corresponding protocol entities so that all the scheduling on the DL on these bearers will be made only on the MN leg of the split bearer. The SCG bearers and the SN leg of the MCG-split bearers will remain suspended.

Operation 13: The MN prepares an RRCConnectionResume message taking into account the admission control information received as per Operation 11. For example, if the received indication was a success, the radioResourceConfigDedicated IE included in the RRCConnectionResume message can include all the stored bearers in the UE context (i.e. MCG, MCG-Split, SCG, SCG-split). As another example, if the received indication was a failure, the radioResourceConfigDedicated can indicate the SCG, SCG-split to be released and the MCG-split bearer to be converted to an MCG bearer. Another example is if the received indication contained the detailed admission control result of every SCG, SCG-split and MCG-split bearer, those bearers that were not admitted can be included in the bearers to be released list.

Operation 14: The MN can also perform admission control on the concerned bearers (i.e. MCG, MCG-split and SCG-split), and the RRCConnectionResume message can be prepared based on that on top of (or instead of) that of Operation 12, in a way similar to that of Operation 12, this time impacting the MCG/MCG-Split and SCG-Split bearers. If none of the bearers can be admitted in the SN (as per Operation 12), and the MN also can not admit the MCG bearers, an RRCConnectionResumeReject message can be prepared instead.

Operation 15: The RRCConnectionResume message may optionally indicate a "partial" or "full" resume flag.

Operation 16: The prepared RRCConnectionResume or RRCConnectionResumeReject message, as per Operations 13 to 15, is sent to the UE.

Operation 17: If the result of Operation 12 to 14 was the preparation of an RRCConnectionResumeReject message, the MN may initiate a HO procedure to another eNB.

Operation 18: The UE, upon the reception of an RRCConnectionResume message, applies the configuration included in the radioResourceConfigDedicated. If no such IE is included, the UE can assume the saved UE AS context still apply. The UE will resume all the relevant MCG, MCG-Split and SCG-Split bearers (i.e. based on the saved UE AS context and/or the received radioResourceConfigDedicated). If the "partial" resume flag was included, the UE will not resume the SCG bearers. The partial resume flag may not be included and the UE may implicitly deduce it is a partial resume as it is getting the RRCConnectionResume message before sending a measurement report. For any MCG-Split or SCG-Split bearers that are resumed, the UE will be configured to schedule only on the MN leg in the UL direction. The SCG bearers remain suspended.

Operation 19: The UE, upon getting a scheduling grant, sends a measurement report to the MN.

Operation 20: The MN, upon getting a measurement report as per Operation 19 indicating that the UE has good radio conditions with the SN node and that node is still the best candidate not for DC, will send an indication to both the SN and the UE that a full resumption of the DC can be made. The resumeIdentity may be included in the message.

Operation 21: The SN, upon getting the full resumption indication from the MN as per Operation 20, resumes the SCG bearers (if any) of the UE (that were admitted as per Operations 11-12, if that applies). It will also enable scheduling on the SN legs of the SCG-Split bearers.

Operation 22: The UE, upon getting the full resumption indication from the MN as per Operation 20, resumes the SCG bearers (if any) of the UE (that were indicated to be admitted as per Operation 18). It will also enable scheduling on the SN legs of the MCG-Split and SCG-Split bearers.

Operation 23: The MN, upon getting a measurement report as per Operation 19 indicating that the UE the SN node is no more the best candidate for DC (e.g. there may be another SN with a better radio conditions to the UE, or neither the SN node or any other node has good enough conditions to be added as a secondary node for DC), will initiate SN release and/or change procedure with the SN and the UE.

Operation 24: In case the SN has to be changed, if the new SN and the old SN share the same PDCP (e.g. centralized PDCP operation in the secondary network), the SCG and SCG-Split bearer contexts can be resumed in the new SN node, and the impact could be invisible from the UE and MN perspective.

Operation 25: If the resume operation is initiated in a node other than the MN where the UE was suspended, the new MN node can fetch the context from the old MN (which it can deduct from the resumeIdentity included in the resume request). If the old SN has a backhaul link with the MN and it is possible for the two nodes to operate in DC mode, all the previous Operations are applicable with the new node taking the role of the old MN. If it was not possible to have DC operations between the new MN node and the SN, the MN may decide, in responding to the resume request, to release all the SCG and SCG-split bearers and indicate so to the UE in the RRCConnectionResume message.

Embodiment 26: In accordance with the above embodiments, if the UE has been configured to do measurement reporting in inactive state, and sends the measurement report along with, or immediately after, the resume request, the full resumption of DC operations is performed without going through the intermediate partial resumption procedure described above if the measurements were indicating favorable conditions for both the MN and SN.

Operation 27: The MN can store the current time when the UE was sent to inactive mode, and start a timer. When the UE requests for resume later on, the MN can calculate the duration the UE has spent in inactive mode by comparing the current time and the stored time, and based on that decide whether to restore the DC related bearers or not. For example, if the duration was very short (below a certain configurable duration duration_low), the MN can try to restore the whole DC, while if the duration was very long (above a certain configuration duration duration_high), the MN will not try to restore the DC related bearers or convert them to MCG bearers. If the duration was intermediate (above duration_low and below duration_high), the MN may decide to wait for a measurement report before trying to restore the whole DC context and in the mean time proceed with the partial resume as described in some of the embodiments above Operation 28: The UE can be configured with two timer values, duration_low and duration_high, upon or before being sent to inactive mode. The UE may start performing measurements, if configured to do measurement in the inactive mode, only if it stays in the inactive mode for at least duration_low. If the UE stays too long in inactive mode (longer than duration_high), it stops performing measurements. On resume, the UE may send the measurements only if it was inactive for a duration between duration_low and duration_high.

Operations of main network node 400 will now be discussed with reference to the flow chart of FIG. 5. For example, modules may be stored in memory 409 of FIG. 4, and these modules may provide instructions so that when the instructions of a module are executed by processor 403, processor 403 performs respective operations of the flow chart of FIG. 5. Moreover, the network node of FIG. 4 may be either a main network node or a secondary network node.

Methods of operating a main network node (MN) supporting dual connectivity, DC, communication with a wireless terminal (UE) in cooperation with a secondary network node (SN) will be discussed with respect to the flow chart of FIG. 5. Network node processor 403 may provide dual connectivity (DC) communication with the wireless terminal in cooperation with the secondary network node at block 501, e.g., using a DC module. At block 503, processor 403 may decide whether to suspend dual connective communication for the wireless terminal.

Responsive to deciding to suspend the dual connectivity communication with the wireless terminal, processor 403 may transmit a connection release message to the wireless terminal at block 505, e.g., using a Connection Release Transmission module. Responsive to deciding to suspend the dual connectivity communication with the wireless terminal, processor 403 may transmit a suspension indication message to the secondary network node at block 507, e.g., using a suspension indication transmission module. Responsive to deciding to suspend the dual connectivity communication with the wireless terminal, processor 403 may transmit a measurement configuration message to the wireless terminal defining radio link measurements to be performed by the wireless terminal while the dual connectivity communication with the wireless terminal is suspended at block 509, e.g., using a measurement configuration transmission module.

Responsive to deciding to suspend dual connectivity communication with the wireless terminal, processor may save an access stratum, AS, context for the dual connectivity communication with the wireless terminal at block 511 so that the access stratum context for the dual connectivity communication is maintained at the main network node while the dual connectivity communication with the wireless terminal is suspended, e.g., using an AC context module. Responsive to deciding to suspend the dual connectivity communication with the wireless terminal, processor 403 may suspend the dual connectivity communication with the wireless terminal at block 515, e.g., using a suspension module.

Responsive to deciding to resume dual connectivity communications with the wireless terminal at block 517, processor 403 may resume dual connectivity communication with the wireless terminal at block 519, e.g., using a DC communication resumption module. Details of resuming DC communication are discussed with respect to FIGS. 2A, 2B, and 2C and Embodiments 8-11. Operations of block 517 according to different embodiments are illustrated in FIGS. 7, 8, and 9.

Figure 5:
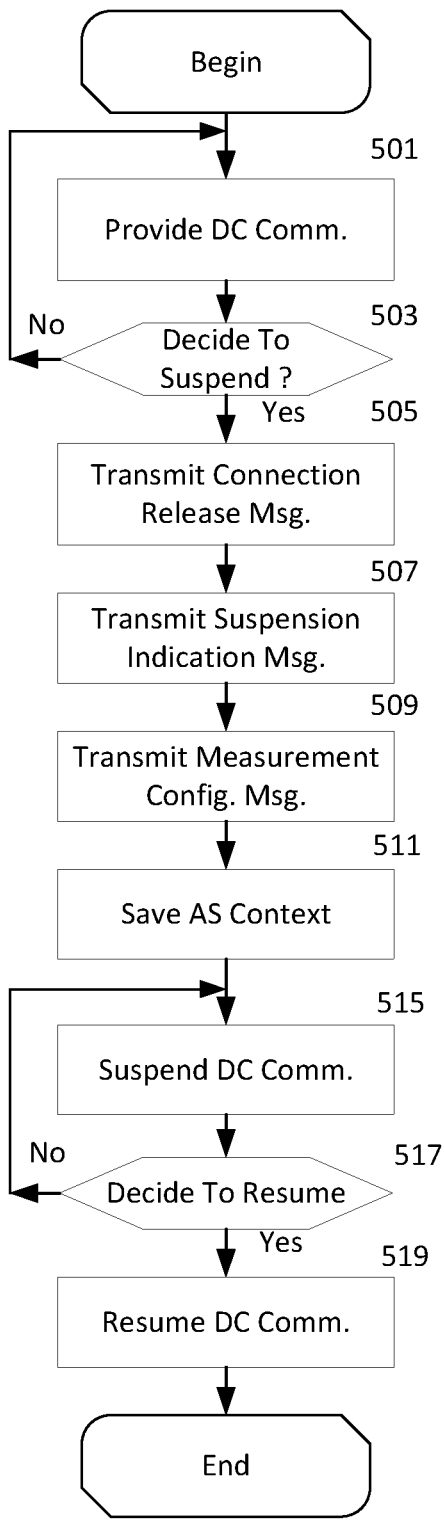

In embodiments of FIG. 7, after suspending the dual connectivity communication at block 515 of FIG. 5, processor 403 may receive a measurement report from the mobile terminal through transceiver 407 at block 701, with the measurement report providing radio link measurement information for radio links with the main network node and/or the secondary network node. Responsive to receiving the measurement report, processor 403 may transmit a full resume indication through network interface 405 to the secondary network node at block 703 to resume the dual connectivity communication with the wireless terminal. Responsive to receiving the measurement report, processor 403 may transmit a full resume indication through transceiver 407 to the wireless terminal at block 705 to resume the dual connectivity communication with the wireless terminal. Responsive to receiving the measurement report, processor 403 may resume dual connectivity communication with the wireless terminal at block 519 of FIG. 5.

In embodiments of FIG. 8, after suspending the dual connectivity communication, processor 403 may transmit a partial resume indication through network interface 405 to the secondary network node at block 801, with the partial resume indication including the resume identity. After transmitting the partial resume indication, processor 403 may receive a measurement report from the mobile terminal through transceiver 407 at block 803, with the measurement report providing radio link measurement information for radio links with the main network node and/or the secondary network node. After receiving the measurement report, processor 403 may transmit (805) a full resume indication through network interface 405 to the secondary network node at block 805, with the full resume indication including the resume identity. Processor 403 may then resume dual connectivity communication with the wireless terminal at block 519 of FIG. 5.

In embodiments of FIG. 9, after suspending the dual connectivity communication, processor may transmit (901) a partial resume indication through transceiver 407 to the wireless terminal at block 901, with the partial resume indication including the resume identity. After transmitting the partial resume indication to the wireless terminal and before receiving the measurement report, processor 403 may resume master cell group bearers, master cell group split bearers, and secondary cell group split bearers for the dual connectivity communication with the wireless terminal at block 903 while disabling secondary network legs of the master and secondary cell group split bearers. After resuming master cell group bearers, master cell group split bearers, and secondary cell group split bearers, processor 403 may receive a measurement report from the mobile terminal through transceiver 407 at block 905, with the measurement report providing radio link measurement information for radio links with the main network node and/or the secondary network node. After receiving the measurement report, processor 403 may transmit a full resume indication through network interface 405 to the secondary network node at block 907, with the full resume indication including the resume identity. After transmitting the full resume indication to the secondary network node, processor 403 may enable the secondary network legs of the master and secondary cell group bearers at block 909. Processor 403 may then resume dual connectivity communication with the wireless terminal at block 519 of FIG. 5.

Various operations of FIGS. 5, 7, 8, and 9 may be optional with respect to some embodiments. Regarding methods of example embodiment 1 (set forth below), for example, operations of blocks 503, 509, 511, 517, 519, 701, 703, 705, 801, 803, 805, 901, 903, 905, 907, and 909 may be optional.

Operations of secondary network node 400 will now be discussed with reference to the flow chart of FIG. 6. For example, modules may be stored in memory 409 of FIG. 4, and these modules may provide instructions so that when the instructions of a module are executed by processor 403, processor 403 performs respective operations of the flow chart of FIG. 5. Moreover, the network node of FIG. 4 may be either a main network node or a secondary network node.

Methods of operating a network node supporting dual connectivity with a wireless terminal (UE) as a secondary network node (SN) in cooperation with a main network node (MN) will be discussed with respect to FIG. 6. At block 601, processor 403 may provide dual connectivity communication with the wireless terminal in cooperation with the main network node, e.g., using a DC communication module. Responsive to a suspension indication at block 603, processor 403 may receive a suspension indication message, e.g., using a suspension indication reception module.

Responsive to receiving the suspension indication message from the main network node, processor may save an access stratum, AS, context for the dual connectivity communication with the wireless terminal at block 607 so that the access stratum context for the dual connectivity communication is maintained at the secondary network node after suspending the dual connectivity communication with the wireless terminal, e.g. using an access stratum saving module. Responsive to receiving the suspension indication message from the main network node, processor 403 may suspend the dual connectivity communication with the wireless terminal at block 609, for example, using a suspension module.

At block 610, processor may decide to resume DC communication, and at block 611, processor 403 may resume DC communication with the wireless terminal, e.g., using a DC communication resumption module. Details of resuming DC communication are discussed with respect to FIGS. 2A, 2B, and 2C and Embodiments 21-25.

Operations of block 601 according to some embodiments are illustrated in FIG. 12 where the suspension indication message includes a resume identity and the access stratum context is associated with the resume identity. After suspending the dual connectivity communication and responsive to a partial resume indication, processor 403 may receive the partial resume indication from the main network node through network interface 405 at block 1203, with the partial resume indication including the resume identity. Responsive to receiving the partial resume indication, processor 403 may resume a secondary cell group split bearer for the dual connectivity communication at block 1205 based on the access stratum context while disabling a secondary network node leg of the split bearer and while maintaining suspension of a secondary cell group bearer for the dual connectivity communication. After resuming the secondary cell group split bearer and responsive to a full resume indication at block 1207, processor 403 may receive the full resume indication including the resume identity through network interface 405 at block 1209. Responsive to receiving the full resume indication, processor 403 may resuming the secondary cell group bearer for the dual connectivity communication at block 1211 based on the access stratum context and enabling the secondary network node leg of the split bearer to resume DC communication at block 611.

Figure 6:
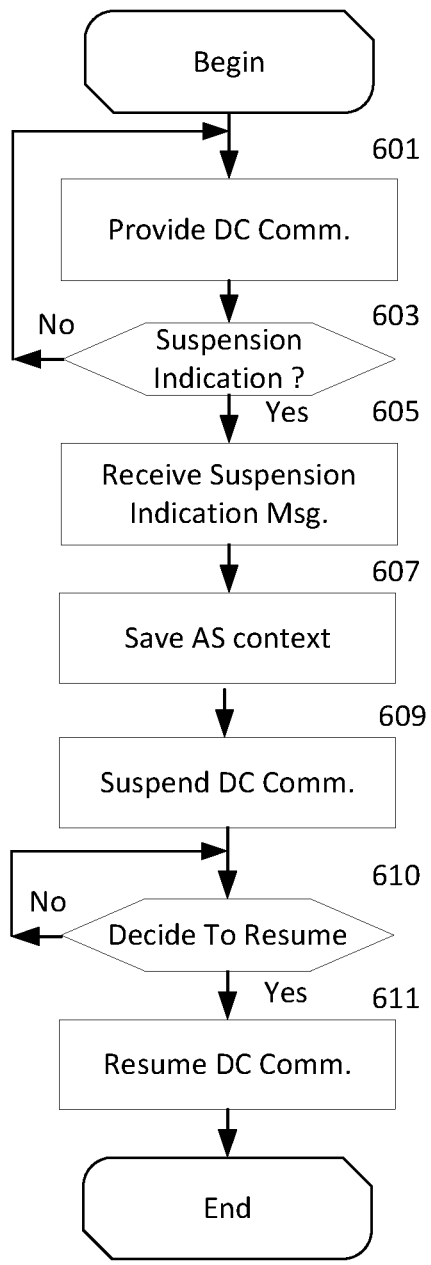

Various operations of FIGS. 6 and 12 may be optional with respect to some embodiments. Regarding methods of example embodiment 16 (set forth below), for example, operations of blocks 603, 607, 611, 1201, 1203, 1205, 1207, 1209, and 1211 may be optional.

Operations of wireless terminal 300 will now be discussed with reference to the flow charts of FIGS. 10 and 11. For example, modules may be stored in memory 307 of FIG. 3, and these modules may provide instructions so that when the instructions of a module are executed by processor 303, processor 303 performs respective operations of the flow chart of FIG. 10 or 11.

Operations of blocks 1001, 1003, 1005, 1007, 1009, and 1011 are the same for embodiments of FIGS. 10 and 11, and will be discussed as follows. At block 1001, processor 303 may provide dual connectivity communication with the main network node and the secondary network node, and at block 1003, processor 303 may receive a connection release message from the main network node through transceiver 301. At block 1005, processor 303 may receive a measurement configuration message from the main network node through transceiver 301, with the measurement configuration message defining radio link measurements to be performed by the wireless terminal while the dual connectivity communication with the wireless terminal is suspended. After receiving the measurement configuration message and responsive to receiving the connection release message, processor 303 may suspend the dual connectivity communication with the main network node and the secondary network node at block 1007. Responsive to receiving the connection release message, processor 303 may save an access stratum AS context for the dual connectivity communication with the main and secondary network nodes at block 1009 so that the access stratum context for the dual connectivity communication is maintained at the wireless terminal after suspending the dual connectivity communication with the main and secondary network nodes. At block 1011, processor 303 may perform a radio link measurement with respect to the main network node and/or the secondary network node while the dual connectivity communication with the main and secondary network nodes is suspended, with the radio link measurement being performed in accordance with the measurement configuration message.

Figure 10:
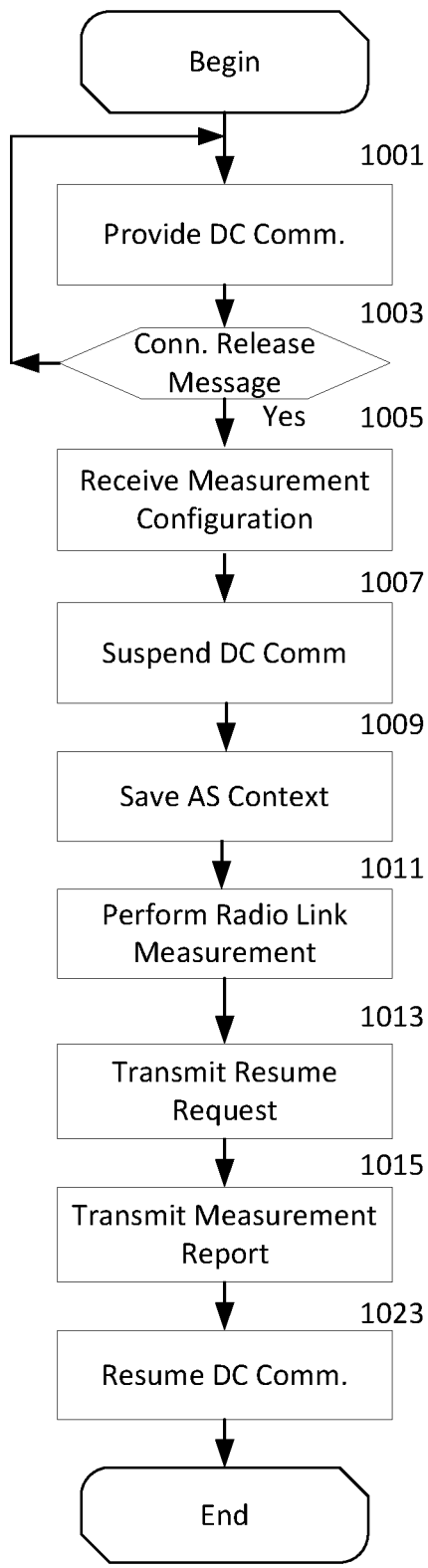
FIGS. 10 and 11 are flow charts illustrating operations of a wireless terminal according to some embodiments of inventive concepts.

According to embodiments of FIG. 10, processor 303 may transmit a resume request through transceiver 301 to the main network node at block 1013 while the dual connectivity communication is suspended. After transmitting the resume request, processor 303 may transmit a measurement report to the main network node at block 1015, with the measurement report including information based on the radio link measurement performed during suspension of the dual connectivity communication. At block 1023, processor 303 may resume the dual connectivity communication.

Figure 11:
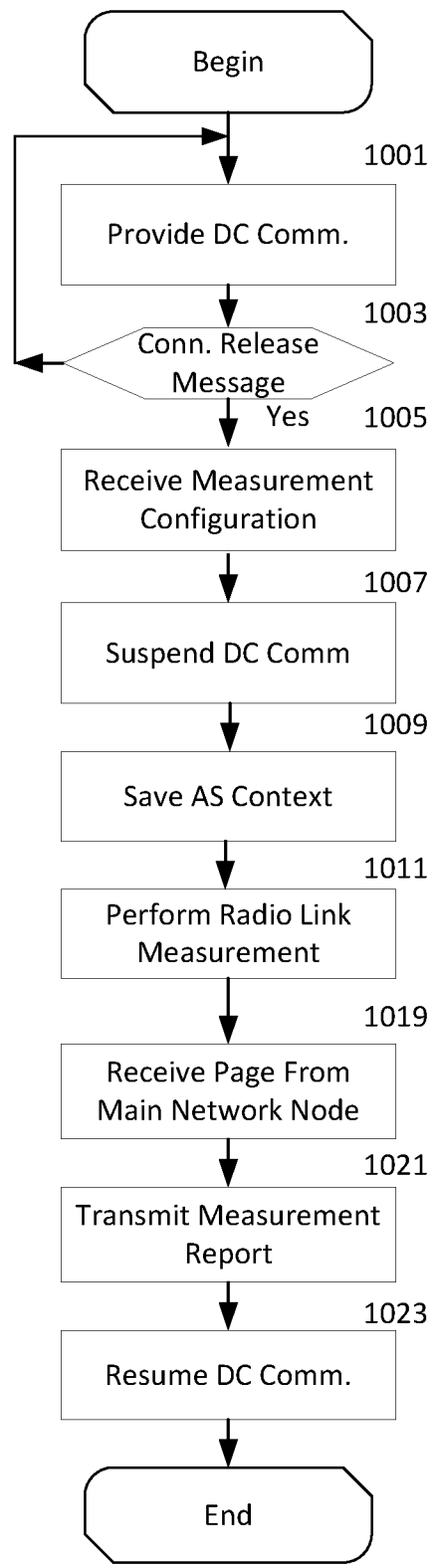

According to embodiments of FIG. 11, processor 303 may receive a page from the main network node through transceiver 301 while the dual connectivity communication is suspended at block 1019, with the page indicating the arrival of downlink data. After receiving the page, processor may transmit (1021) a measurement report through transceiver 301 to the main network node at block 1021, with the measurement report including information based on the radio link measurement performed during suspension of the dual connectivity communication. At block 1023, processor 303 may resume the dual connectivity communication.

Various operations of FIGS. 10 and 11 may be optional with respect to some embodiments. Regarding methods of example embodiment 27 (set forth below), for example, operations of blocks 1005, 1009, 1013, 1015, 1019, 1021, and 1023 may be optional.

Example embodiments according to some embodiments of inventive concepts are discussed below.

Embodiment 1. A method of operating a network node supporting dual connectivity, DC, communication with a wireless terminal (UE) as a main network node (MN) in cooperation with a secondary network node (SN), the method comprising: providing dual connectivity communication with the wireless terminal in cooperation with the secondary network node; responsive to deciding to suspend the dual connectivity communication with the wireless terminal, transmitting a connection release message to the wireless terminal; responsive to deciding to suspend the dual connectivity communication with the wireless terminal, transmitting a suspension indication message to the secondary network node; and responsive to deciding to suspend the dual connectivity communication with the wireless terminal, suspending the dual connectivity communication with the wireless terminal.

Embodiment 2. The method of Embodiment 1 further comprising: responsive to deciding to suspend dual connectivity communication with the wireless terminal, saving an access stratum, AS, context for the dual connectivity communication with the wireless terminal so that the access stratum context for the dual connectivity communication is maintained at the main network node while the dual connectivity communication with the wireless terminal is suspended.

Embodiment 3. The method of Embodiment 2 wherein the access stratum context for the dual connectivity communication includes information regarding master cell group, MCG, bearers for the main network node and secondary cell group, SCG, bearers for the secondary network node.

Embodiment 4. The method of any of Embodiments 2-3 wherein the access stratum context for the dual connectivity communication includes radio resource control configurations for the main and secondary network nodes.

Embodiment 5. The method of any of Embodiments 2-4 wherein the access stratum context for the dual connectivity communication includes security contexts for main and secondary cell groups of the main and secondary network nodes, packet data convergence protocol states for the main and secondary network nodes, robust header compression states for the main and secondary network nodes, cell radio network temporary identifiers for the main and secondary network nodes, and/or identities associated with a PCell and a PSCell.

Embodiment 6. The method of any of Embodiments 1-5 wherein the connection release message comprises an RRC-ConnectionRelease command with an rrc-suspend flag on.

Embodiment 7. The method of any of Embodiments 1-6 further comprising: responsive to deciding to suspend the dual connectivity communication with the wireless terminal, transmitting a measurement configuration message to the wireless terminal defining radio link measurements to be performed by the wireless terminal while the dual connectivity communication with the wireless terminal is suspended.

Embodiment 8. The method of any of Embodiments 1-7 further comprising: after suspending the dual connectivity communication, receiving a measurement report from the mobile terminal providing radio link measurement information for radio links with the main network node and/or the secondary network node.

Embodiment 9. The method of Embodiment 8 further comprising: responsive to receiving the measurement report, transmitting a full resume indication to the secondary network node to resume the dual connectivity communication with the wireless terminal; responsive to receiving the measurement report, transmitting a full resume indication to the wireless terminal to resume the dual connectivity communication with the wireless terminal; and responsive to receiving the measurement report, resuming dual connectivity communication with the wireless terminal.

Embodiment 10. The method of Embodiment 8 further comprising: after suspending the dual connectivity communication and before receiving the measurement report, transmitting a partial resume indication to the secondary network node, wherein the partial resume indication includes the resume identity; after receiving the measurement report, transmitting a full resume indication to the secondary network node, wherein the full resume indication includes the resume identity.

Embodiment 11. The method of Embodiment 8 further comprising: after suspending the dual connectivity communication and before receiving the measurement report, transmitting a partial resume indication to the wireless terminal, wherein the partial resume indication includes the resume identity; after sending the partial resume indication to the wireless terminal and before receiving the measurement report, resuming master cell group bearers, master cell group split bearers, and secondary cell group split bearers for the dual connectivity communication with the wireless terminal while disabling secondary network legs of the master and secondary cell group split bearers; after receiving the measurement report, transmitting a full resume indication to the secondary network node, wherein the full resume indication includes the resume identity; and after transmitting the full resume indication to the secondary network node, enabling the secondary network legs of the master and secondary cell group bearers.

Embodiment 12. The method of any of Embodiments 1-11 wherein the main network node and the secondary network node are nodes of different radio access technologies.

Embodiment 13. The method of Embodiment 12 wherein one of the main and secondary network nodes is an LTE network node, and the other of the main and second network nodes is an NR network node.

Embodiment 14. A network node supporting dual connectivity communication with a wireless terminal as a main network node (MN) in cooperation with a secondary network node, the main network node comprising: a transceiver configured to provide wireless network communication with the wireless terminal; a network interface configured to provide network communication with the secondary network node; and a processor coupled with the transceiver and the network interface, wherein the processor is configured to provide communication with the wireless terminal through the transceiver, wherein the processor is configured to provide communication with the secondary network node through the network interface, and wherein the processor is configured to perform operations according to any of Embodiments 1-13.

Embodiment 15. A network node, wherein the network node is adapted to perform according to any of Embodiments 1-13.

Embodiment 16. A method of operating a network node supporting dual connectivity with a wireless terminal (UE) as a secondary network node (SN) in cooperation with a main network node (MN), the method comprising: providing dual connectivity communication with the wireless terminal in cooperation with the main network node; receiving a suspension indication message; and responsive to receiving the suspension indication message from the main network node, suspending the dual connectivity communication with the wireless terminal.

Embodiment 17. The method of Embodiment 16 further comprising: responsive to receiving the suspension indication message from the main network node, saving an access stratum, AS, context for the dual connectivity communication with the wireless terminal so that the access stratum context for the dual connectivity communication is maintained at the secondary network node after suspending the dual connectivity communication with the wireless terminal.

Embodiment 18. The method of Embodiment 17 wherein the access stratum context for the dual connectivity communication includes information regarding secondary cell group, SCG, bearers for the secondary network node.

Embodiment 19. The method of any of Embodiments 17-18 wherein the access stratum context for the dual connectivity communication includes at least one of a radio resource control configuration for the secondary network node, a security context for a secondary cell group of the secondary network node, a packet data convergence protocol state for the secondary network node, a robust header compression state for the secondary network node, a cell radio network temporary identifier for the secondary network node, and/or an identity associated with a PSCell.

Embodiment 20. The method of any of Embodiments 17-19 wherein the suspension indication message includes a resume identity, and wherein the access stratum context is associated with the resume identity.

Embodiment 21. The method of Embodiment 20 further comprising: after suspending the dual connectivity communication, receiving a partial resume indication from the main network node, wherein the partial resume indication includes the resume identity; responsive to receiving the partial resume indication, resuming a secondary cell group split bearer for the dual connectivity communication based on the access stratum context while disabling a secondary network node leg of the split bearer and while maintaining suspension of a secondary cell group bearer for the dual connectivity communication.

Embodiment 22. The method of Embodiment 21 further comprising: after resuming the secondary cell group split bearer, receiving a full resume indication including the resume identity; and responsive to receiving the full resume indication, resuming the secondary cell group bearer for the dual connectivity communication based on the access stratum context and enabling the secondary network node leg of the split bearer.

Embodiment 23. The method of any of Embodiments 16-22 wherein suspending the dual connectivity communication comprises suspending secondary cell group bearers and secondary cell group split bearers associated with the dual connectivity communication with the wireless terminal.

Embodiment 24. The method of any of Embodiments 16-23 wherein the main network node and the secondary network node are nodes of different radio access technologies.

Embodiment 25. The method of Embodiment 24 wherein one of the main and secondary network nodes is an LTE network node, and the other of the main and second network nodes is an NR network node.

Embodiment 26. A network node supporting dual connectivity communication with a wireless terminal as a secondary network node (SN) in cooperation with a main network node, the secondary network node comprising: a transceiver configured to provide wireless network communication with the wireless terminal; a network interface configured to provide network communication with the main network node; and a processor coupled with the transceiver and the network interface, wherein the processor is configured to provide communication with the wireless terminal through the transceiver, wherein the processor is configured to provide communication with the main network node through the network interface, and wherein the processor is configured to perform operations according to any of Embodiments 16-25.

Embodiment 27. A method of operating a wireless terminal supporting dual connectivity with a main network node and a secondary network node, the method comprising: providing dual connectivity communication with the main network node and the secondary network node; receiving a connection release message from the main network node; and responsive to receiving the connection release message, suspending the dual connectivity communication with the main network node and the secondary network node.

Embodiment 28. The method of Embodiment 27 further comprising: responsive to receiving the connection release message, saving an access stratum, AS, context for the dual connectivity communication with the main and secondary network nodes so that the access stratum context for the dual connectivity communication is maintained at the wireless terminal after suspending the dual connectivity communication with the main and secondary network nodes.

Embodiment 29. The method of Embodiment 28 wherein the access stratum context includes radio resource control configurations for the main and secondary network nodes.

Embodiment 30. The method of any of Embodiments 28-29 wherein the access stratum context includes security contexts for bearers of the main and secondary network nodes, packet data convergence protocol states of the main and secondary network nodes, cell radio network temporary identifiers of the main and secondary network nodes, cell identities of the main and secondary network nodes, and physical cell identities of the main and secondary nodes.

Embodiment 31. The method of any of Embodiments 27-30 wherein suspending the dual connectivity communication comprises suspending bearers of the main and secondary network nodes.

Embodiment 32. The method of any of Embodiments 27-31 wherein the connection release message comprises an RRCConnectionRelease command with an rrc-suspend flag on.

Embodiment 33. The method of any of Embodiments 27-32 further comprising: performing a radio link measurement with respect to the main network node and/or the secondary network node while the dual connectivity communication with the main and secondary network nodes is suspended.

Embodiment 34. The method of Embodiment 33 further comprising: before suspending the dual connectivity communication with the main and secondary network nodes, receiving a measurement configuration message from the main network node defining radio link measurements to be performed by the wireless terminal while the dual connectivity communication with the wireless terminal is suspended, wherein performing the radio link measurement comprises performing the radio link measurement in accordance with the measurement configuration message.

Embodiment 35. The method of any of Embodiments 33-34, further comprising: while the dual connectivity communication is suspended, transmitting a resume request to the main network node; and after transmitting the resume request, transmitting a measurement report to the main network node wherein the measurement report includes information based on the radio link measurement performed during suspension of the dual connectivity communication.

Embodiment 36. The method of any of Embodiments 33-34 further comprising: while the dual connectivity communication is suspended, receiving a page from the main network node indicating arrival of downlink data; and after receiving the page, transmitting a measurement report to the main network node wherein the measurement report includes information based on the radio link measurement performed during suspension of the dual connectivity communication.

Embodiment 37. The method of any of Embodiments 27-36 wherein the main network node and the secondary network node are nodes of different radio access technologies.

Embodiment 38. The method of Embodiment 37 wherein one of the main and secondary network nodes is an LTE network node, and the other of the main and second network nodes is an NR network node.

Embodiment 39. A wireless terminal, UE, comprising: a transceiver configured to provide dual connectivity wireless network communication with main network node and a secondary network node; and a processor coupled with the transceiver, wherein the processor is configured to provide wireless network communication through the transceiver, wherein the processor is configured to perform operations according to any of Embodiments 27-38.

Embodiment 40. A wireless terminal, UE, wherein the wireless terminal is adapted to perform according to any of Embodiments 27-38.

Embodiment 41. A network node, wherein the network node is adapted to perform according to any of Embodiments 16-25.

Explanations of abbreviations used herein are provided below.

| Abbreviation | Explanation |
| --- | --- |
| MeNB: | Master eNB |
| SeNB: | Secondary eNB |
| TNL: | Transport Network Layer |
| UE: | User Equipment |
| SCG: | Secondary Cell Group |
| MCG: | Master Cell Group |
| NR: | New Radio |
| AS: | Access Stratum |
| CP: | Control Plane |
| UP: | User Plane |
| CN | Core Network |
| FFS: | For Further Study |
| ROHC: | Robust Header Compression |

-continued

| Abbreviation | Explanation |
| --- | --- |
| PDCP: | Packet Data Convergence Protocol |
| SRB: | Signaling Radio Bearer |
| DRB: | Data Radio Bearer |

Further definitions are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a network node supporting dual connectivity communication with a wireless terminal as a main network node in cooperation with a secondary network node, the method comprising:
providing dual connectivity communication with the wireless terminal in cooperation with the secondary network node;
responsive to deciding to suspend the dual connectivity communication with the wireless terminal, transmitting a connection release message to the wireless terminal;
responsive to deciding to suspend the dual connectivity communication with the wireless terminal, transmitting a suspension indication message to the secondary network node;
responsive to deciding to suspend dual connectivity communication with the wireless terminal, saving an access stratum context for the dual connectivity communication with the wireless terminal so that the access stratum context for the dual connectivity communication is maintained at the main network node while the dual connectivity communication with the wireless terminal is suspended; and
responsive to deciding to suspend the dual connectivity communication with the wireless terminal, suspending the dual connectivity communication with the wireless terminal.

2. The method of claim 1, further comprising:
responsive to deciding to suspend the dual connectivity communication with the wireless terminal, transmitting a measurement configuration message to the wireless terminal defining radio link measurements to be performed by the wireless terminal while the dual connectivity communication with the wireless terminal is suspended.

3. The method of claim 1, further comprising:
after suspending the dual connectivity communication, receiving a measurement report from the wireless terminal providing radio link measurement information for radio links with the main network node and/or the secondary network node.

4. The method of claim 3, further comprising:
while the dual connectivity communication is suspended, transmitting a page to the wireless terminal indicating arrival of downlink data for the wireless terminal,
wherein the measurement report is received after transmitting the page during suspension of the dual connectivity communication.

5. The method of claim 1, wherein suspending the dual connectivity communication comprises suspending the dual connectivity communication to suspend bearers of both the main network node and the secondary network node.

6. A method of operating a network node supporting dual connectivity with a wireless terminal as a secondary network node in cooperation with a main network node, the method comprising:
providing dual connectivity communication with the wireless terminal in cooperation with the main network node;
receiving a suspension indication message from the main network node;

responsive to receiving the suspension indication message from the main network node, suspending the dual connectivity communication with the wireless terminal; and responsive to receiving the suspension indication message from the main network node, saving an access stratum context for the dual connectivity communication with the wireless terminal so that the access stratum context for the dual connectivity communication is maintained at the secondary network node after suspending the dual connectivity communication with the wireless terminal.

7. The method of claim 6, wherein the suspension indication message includes a resume identity, and wherein the access stratum context is associated with the resume identity.

8. The method of claim 7, further comprising:

after suspending the dual connectivity communication, receiving a partial resume indication from the main network node, wherein the partial resume indication includes the resume identity; and responsive to receiving the partial resume indication, resuming a secondary cell group split bearer for the dual connectivity communication based on the access stratum context while disabling a secondary network node leg of the split bearer and while maintaining suspension of a secondary cell group bearer for the dual connectivity communication.

9. The method of claim 8, further comprising:

after resuming the secondary cell group split bearer, receiving a full resume indication including the resume identity; and responsive to receiving the full resume indication, resuming the secondary cell group bearer for the dual connectivity communication based on the access stratum context and enabling the secondary network node leg of the split bearer.

10. The method of claim 6, wherein suspending the dual connectivity communication comprises suspending the dual connectivity communication to suspend bearers of both the main network node and the secondary network node.

11. A method of operating a wireless terminal supporting dual connectivity with a main network node and a secondary network node, the method comprising:

providing dual connectivity communication with the main network node and the secondary network node;

receiving a connection release message from the main network node;

responsive to receiving the connection release message, suspending the dual connectivity communication with the main network node and the secondary network node;

responsive to receiving the connection release message, saving an access stratum-context for the dual connectivity communication with the main and secondary network nodes so that the access stratum context for the dual connectivity communication is maintained at the wireless terminal after suspending the dual connectivity communication with the main and secondary network nodes; and performing a radio link measurement with respect to the main network node and/or the secondary network node while the dual connectivity communication with the main and secondary network nodes is suspended.

12. The method of claim 11, further comprising:

before suspending the dual connectivity communication with the main and secondary network nodes, receiving a measurement configuration message from the main network node defining radio link measurements to be performed by the wireless terminal while the dual connectivity communication with the wireless terminal is suspended, wherein performing the radio link measurement comprises performing the radio link measurement in accordance with the measurement configuration message.

13. The method of claim 11, further comprising:

while the dual connectivity communication is suspended, transmitting a resume request to the main network node; and after transmitting the resume request, transmitting a measurement report to the main network node, the measurement report including information based on the radio link measurement performed during suspension of the dual connectivity communication.

14. The method of claim 11, further comprising:

while the dual connectivity communication is suspended, receiving a page from the main network node indicating arrival of downlink data; and after receiving the page, transmitting a measurement report to the main network node, the measurement report including information based on the radio link measurement performed during suspension of the dual connectivity communication.

15. The method of claim 11, wherein suspending the dual connectivity communication comprises suspending the dual connectivity communication to suspend bearers of both the main network node and the secondary network node.

16. A network node configured to support dual connectivity communication with a wireless terminal as a main network node in cooperation with a secondary network node, the main network node comprising:

a transceiver configured to provide wireless network communication with the wireless terminal;

a network interface configured to provide network communication with the secondary network node; and a processor coupled with the transceiver and the network interface, wherein the processor is configured to provide communication with the wireless terminal through the transceiver, wherein the processor is configured to provide communication with the secondary network node through the network interface, and wherein the processor is configured to:

provide dual connectivity communication with the wireless terminal in cooperation with the secondary network node, transmit a connection release message to the wireless terminal responsive to deciding to suspend the dual connectivity communication with the wireless terminal, transmit a suspension indication message to the secondary network node responsive to deciding to suspend the dual connectivity communication with the wireless terminal, save an access stratum context for the dual connectivity communication with the wireless terminal so that the access stratum context for the dual connectivity communication is maintained at the main network node while the dual connectivity communication with the wireless terminal is suspended; and suspend the dual connectivity communication with the wireless terminal responsive to deciding to suspend the dual connectivity communication with the wireless terminal.

17. The network node of claim 16, wherein the processor is further configured to:
  receive a measurement report from the wireless terminal after suspending the dual connectivity communication, the measurement report providing radio link measurement information for radio links with the main network node and/or the secondary network node.

18. The network node of claim 17, wherein the processor is further configured to:
  transmit a page to the wireless terminal while the dual connectivity communication is suspended, the page indicating arrival of downlink data for the wireless terminal,
  wherein the measurement report is received after transmitting the page during suspension of the dual connectivity communication.

19. A network node configure to support dual connectivity communication with a wireless terminal as a secondary network node in cooperation with a main network node, the secondary network node comprising:
  a transceiver configured to provide wireless network communication with the wireless terminal;
  a network interface configured to provide network communication with the main network node; and
  a processor coupled with the transceiver and the network interface,
  wherein the processor is configured to provide communication with the wireless terminal through the transceiver,
  wherein the processor is configured to provide communication with the main network node through the network interface, and
  wherein the processor is configured to:
    provide dual connectivity communication with the wireless terminal in cooperation with the main network node,
    receive a suspension indication message from the main network node,
    save an access stratum context for the dual connectivity communication with the wireless terminal in response to receiving the suspension indication message from the main network node so that the access stratum context for the dual connectivity communication is maintained at the secondary network node after suspending the dual connectivity communication with the wireless terminal, and
    suspend the dual connectivity communication with the wireless terminal in response to receiving the suspension indication message from the main network node.

20. The network node of claim 19, the processor further configured to:
  transmit a measurement configuration message to the wireless terminal defining radio link measurements to be performed by the wireless terminal while the dual connectivity communication with the wireless terminal is suspended.

21. A wireless terminal comprising:
  a transceiver configured to provide dual connectivity wireless network communication with main network node and a secondary network node; and
  a processor coupled with the transceiver,
  wherein the processor is configured to provide wireless network communication through the transceiver,
  wherein the processor is configured to:
    provide dual connectivity communication with the main network node and the secondary network node,
    receive a connection release message from the main network node,
    suspend the dual connectivity communication with the main network node and the secondary network node responsive to receiving the connection release message,
    save an access stratum-context for the dual connectivity communication with the main and secondary network nodes in response to receiving the connection release message so that the access stratum context for the dual connectivity communication is maintained at the wireless terminal after suspending the dual connectivity communication with the main and secondary network nodes, and
    perform a radio link measurement with respect to the main network node and/or the secondary network node while the dual connectivity communication with the main and secondary network nodes is suspended.

* * * * *

UNITED STATES PATENT AND TRADEMARK OFFICE
CERTIFICATE OF CORRECTION

PATENT NO. : 11,219,085 B2
APPLICATION NO. : 16/066095
DATED : January 4, 2022
INVENTOR(S) : Teyeb et al.

It is certified that error appears in the above-identified patent and that said Letters Patent is hereby corrected as shown below:

In the Specification

In Column 4, Line 21, delete "expect" and insert -- except --, therefor.

In Column 4, Line 22, delete "SRBO." and insert -- SRB0. --, therefor.

In the Claims

In Column 22, Line 63, in Claim 16, delete "suspended; and" and insert -- suspended, and --, therefor.

Signed and Sealed this
Thirty-first Day of May, 2022

Katherine Kelly Vidal
*Director of the United States Patent and Trademark Office*